UNITED STATES PATENT OFFICE.

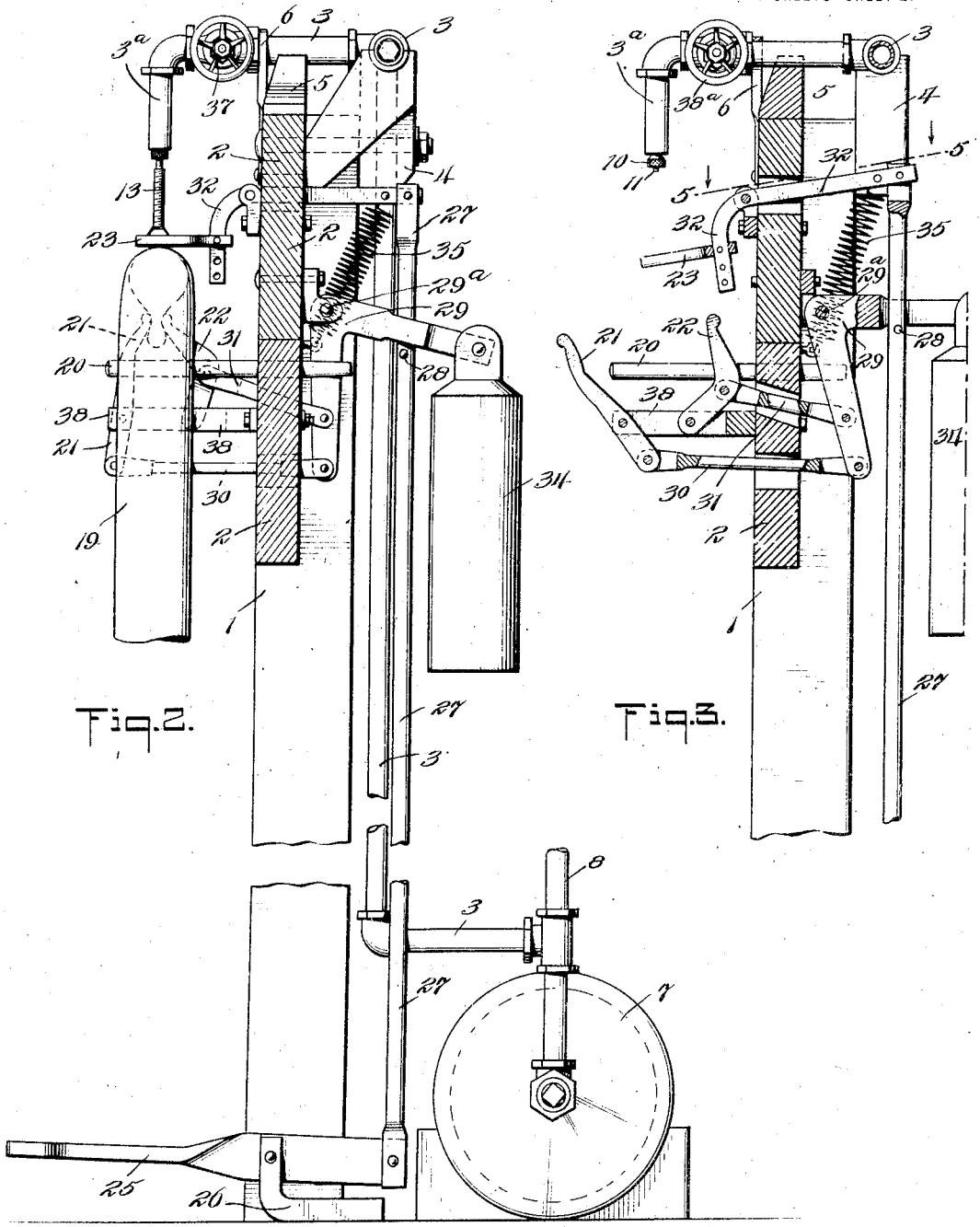

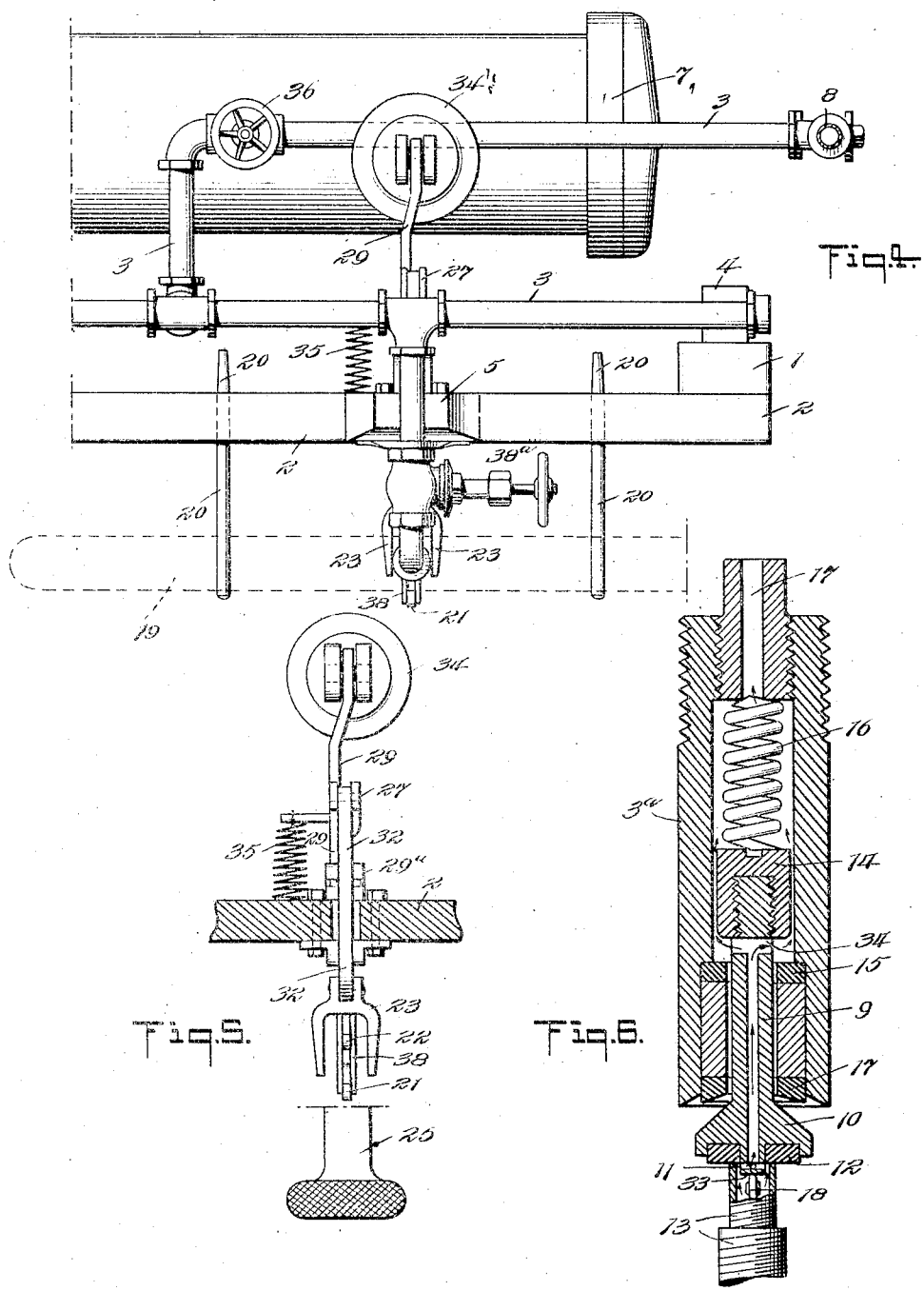

ROBERT McCLENATHEN, OF CUYAHOGA FALLS, OHIO, ASSIGNOR TO KELLY-SPRING-
FIELD TIRE CO., OF NEW YORK, N. Y., A CORPORATION.

INNER-TUBE DEFLATER.

1,313,603. Specification of Letters Patent. Patented Aug. 19, 1919.

Application filed February 19, 1919. Serial No. 278,047.

*To all whom it may concern:*

Be it known that I, ROBERT McCLENA-THEN, a citizen of the United States, residing at Cuyahoga Falls, Summit county, State of Ohio, have invented a new and useful Inner-Tube Deflater, being a device for extracting the air from the inner tubes of pneumatic rubber tires, of which the following is a specification.

In the manufacture of inner tubes such as are commonly used in pneumatic tires, after the tube has been built up and assembled it is usual to inflate it as a test for leakages, after which the air must be removed for economy of space and convenience in handling, as when deflated these tubes occupy only about 10% as much space as when inflated, and as many factories turn out thousands of these inner tubes every day this deflating operation is a matter of considerable time and expense.

Heretofore it has been usual to deflate these tubes by connecting the valve stem of the tire tube with an operating vacuum pump, the tire tube during the deflating operation resting on the floor or a table, with a weight laid on a portion thereof opposite the valve stem to keep the wall of the tube at that point from collapsing and closing the interior outlet of the valve thus preventing the outflow of the air, as unless the wall of the tube opposite the valve stem is held clear of the interior valve opening during the deflation, the suction produced by the outrushing air quickly pulls the wall of the tube opposite the point of suction against the valve opening and blocks further deflation.

My invention consists of a more convenient expeditious and less expensive method of using the vacuum process in the deflation, as I simultaneously and automatically by the mere operation of placing the tire tube in position for deflation open a valve in a vacuum system and the one in the valve stem of the tire tube and pinch up a portion of the tire tube opposite the opening in the valve stem and hold the same clear of the opening during the deflating process.

In practice I use several units of the apparatus assembled in a row on one frame and connected with one vacuum system so that several tires may be in process of deflation simultaneously; one man being able to keep five or six machines in operation at the same time.

In the annexed drawings Figure 1 is front view of the apparatus with a section of tire tube positioned for deflation, the frame work, vacuum pipe and tank being substantially diagrammatic.

Fig. 2 is a side view of the apparatus with a section of the tire tube positioned for deflation.

Fig. 3 is a sectional view of the upper portion of the apparatus positioned ready to receive and grasp the tire tube.

Fig. 4 is a top plan view of one unit.

Fig. 5 is a sectional view on line 5—5 Fig. 3.

Fig. 6 shows details of the vacuum valve with the end of the tire tube valve stem in the position occupied during the deflating process.

Like numerals refer to like parts in all figures.

Figure 1:
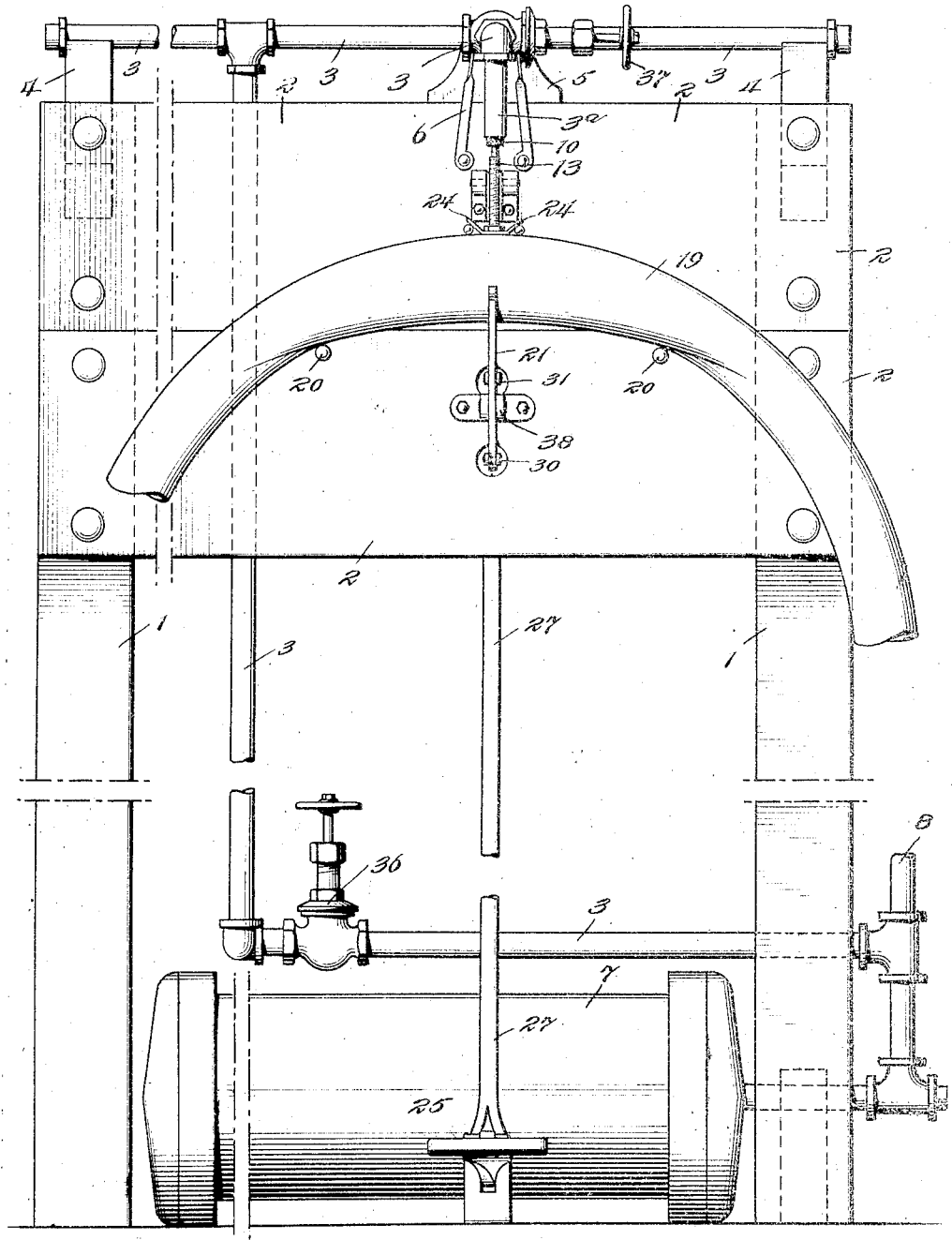

The apparatus consists of a suitable upright supporting frame of convenient height consisting of standards 1, with a substantial head or cross piece 2 to which the principal working parts are attached and which is provided with suitable openings to permit the operation of link bars 30—31 and lever 32. This frame also supports vacuum pipe 3 on brackets 4 and bolster 5, securely held in place by twisted anchor strap 6. Behind standards 1 is located vacuum tank 7 which connects through pipe 8 with a vacuum pump not shown. The end of vacuum pipe 3 terminates in a vacuum valve 3$^a$ shown in detail Fig. 6 which valve consists of movable plug 9 with enlarged head 10 which head terminates in nose piece 11 and is equipped with a fabric washer 12 which contacts with the end of the valve stem 13. Securely attached to plug 9 is cap piece 14 which except during the deflating operation is held in contact with a rubber washer 15 by coiled spring 16, which coiled spring is of sufficient strength to overcome the pull or suction of the vacuum through the orifice 17. The lower end of the vacuum valve Fig. 6 is also equipped with a rubber washer 17 which contacts with the beveled shoulder of the enlarged head 10, when this shoulder is forced up against the washer 17 as it is during the process of deflation.

The ordinary inner tube valve stem contains a movable central pin 18 which when pushed inward permits the imprisoned air in the tire tube to escape. Other parts of the apparatus will be best understood by describing the method of operation.

When not in use the movable parts of the apparatus stand as shown in Fig. 2 (eliminating section of tire tube 19 and valve stem 13 from the drawing) being held in position by the counter weight 34 and coiled spring 35.

To operate the invention the workman with his foot presses down lever 25 which is pivoted on bracket 26. This operation raises rod 27 and the projecting pin 28 located just beneath the horizontal arm of bell crank 29 and which is raised with the movement of rod 27 carrying the horizontal arm of bell crank 29 which is pivoted on pin 29ª. This movement opens jaws 21—22 through the swing of the perpendicular arm of bell crank 29 and the connecting link bars 30—31 which are pivotally attached to, and held in place by stationary bracket 38 and pivotally connected with the descending arm of bell crank 29, these link bars passing through suitable openings in the cross piece of the supporting frame. The raising of rod 27 also simultaneously raises the horizontal arm of lever 32 which is pivotally attached to rod 27 and which movement depresses fork 23 which is rigidly mounted on the descending arm of lever 32.

The inflated tube 19 is then placed on supporting pegs 20, with the valve stem pointed upward, the tube being twisted for that purpose, its flexibility readily permitting this reversal of position. The metal base of the valve stem at the same time is slid over the prongs of fork 23; the foot of the workman is removed from lever 25, and counter weight 34 and coiled spring 35 cause the parts to resume their normal or former position, jaws 21—22 have closed and pinched up a portion of the tire tube as shown in dotted lines Fig. 2 while the prongs of fork 23 have raised the tire tube valve stem 13 forcing the end thereof firmly against fabric washer 12 with the result that the nose piece 11 penetrates valve stem 13 forcing down pin 18 and at the same time the vacuum valve plug 9 is forced upward leaving a clear space between cap piece 14 and rubber washer 15. The nose piece 11 is pierced with small holes one of which is shown 33 Fig. 6 the air then has a free passage through the tube valve stem 13, holes in the nose piece 11, plug 9, orifice 17 in the direction shown by the arrows Fig. 6 and finally through vacuum tube 3 to vacuum tank 7 which tank is kept in the condition of vacuum by the ordinary vacuum pump not shown in the drawings. The vacuum process is started or stopped by operating valve 36. Valve 37 is used only in case repairs are needed to the vacuum valve best shown Fig. 6.

Owing to the smallness of the opening in the tube valve stem it takes quite some time to deflate a tube, and a single workman will have time to operate a battery of five or six of these machines simultaneously, only one exhaust system being required.

I claim as my invention:—

1. In a machine for deflating inner tubes of pneumatic tires, a pair of mounted opposing jaws, a mounted fork having prongs, means to open or close said jaws and raise or lower said fork whereby the interior wall of an inner tube may be held out of contact with the base of the inner tube valve stem during the deflating process.

2. In a machine for deflating inner tubes of pneumatic tires, a pair of opposing jaws pivotally mounted, a mounted fork having prongs, means connected with said jaws and fork whereby said jaws may be opened or closed and said fork be raised or lowered, a vacuum tank connected with an intake valve, said intake valve adapted to contact with the end of the valve stem of the inner tube.

3. In a machine for deflating inner tubes of pneumatic tires, a pair of pivotally mounted opposing jaws, a mounted fork having prongs movable vertically, a foot lever and counterweight connected with said jaws and fork, a vacuum tank, an intake valve connected to said vacuum tank, and means to hold the end of said valve stem of said inner tube in air tight connection with said intake valve.

4. In a machine for deflating inner tubes of pneumatic tires, an intake valve connected with a vacuum tank, a pair of opposing jaws pivotally mounted and adapted to grip and hold a portion of an inner tube, a mounted fork having prongs movable vertically and adapted to engage and hold the valve stem of an inner tube, a foot lever and counter-weight connected with said jaws and fork whereby said jaws may be opened or closed and said fork may be raised or lowered at will and in simultaneous coördination with each other, and whereby the valve stem of said inner tube may be held in air tight connection with said intake valve.

5. In a machine for deflating inner tubes of pneumatic tires, the combination of a pair of pivotally mounted opposing jaws, a mounted fork movable vertically having prongs adapted to hold the valve stem of an inner tube, a vacuum tank having an intake valve connected therewith, means to open and hold open the valve of said inner tube and said intake valve simultaneously.

6. In a machine for deflating inner tubes of pneumatic tires, the combination of a pair of pivotally mounted opposing jaws adapted to grip and hold a portion of an inner tube, a mounted fork movable vertically having prongs adapted to hold the valve stem of an inner tube, means to open or close said jaws and raise or lower said prongs at will, a vacuum tank connected with an intake valve, means to hold said inner tube valve stem in air tight contact with said intake valve and means to open and hold open simultaneously the valve in said valve stem and said intake valve.

7. In a machine for deflating inner tubes of pneumatic tires, the combination of a pair of pivotally mounted opposing jaws adapted to grip and hold a portion of an inner tube out of contact with the base of the inner tube valve stem, a mounted fork having prongs adapted to hold the valve stem of an inner tube, a vacuum tank and an intake valve connected therewith, a foot lever and counter-weight connected with said jaws and fork whereby the interior wall of said inner tube may be held out of contact with the base of said inner tube valve stem during the deflating process.

ROBERT McCLENATHEN